United States Patent
Wang (10) Patent No.: US 10,930,252 B2
(45) Date of Patent: Feb. 23, 2021

(54) DIVIDING IMAGE DATA INTO REGIONAL IMAGES OF DIFFERENT RESOLUTIONS BASED ON A GAZE POINT AND TRANSMITTING THE DIVIDED IMAGE DATA

(71) Applicant: BEIJING 7INVENSUN TECHNOLOGY CO., LTD., Beijing (CN)

(72) Inventor: Yunfei Wang, Beijing (CN)

(73) Assignee: BEIJING 7INVENSUN TECHNOLOGY CO., LTD., Beijing (CN)

(*) Notice: Subject to any disclaimer, the term of this patent is extended or adjusted under 35 U.S.C. 154(b) by 80 days.

(21) Appl. No.: 16/338,434

(22) PCT Filed: Apr. 10, 2018

(86) PCT No.: PCT/CN2018/082443
§ 371 (c)(1),
(2) Date: Mar. 29, 2019

(87) PCT Pub. No.: WO2018/196598
PCT Pub. Date: Nov. 1, 2018

(65) Prior Publication Data
US 2020/0034947 A1    Jan. 30, 2020

(30) Foreign Application Priority Data
Apr. 28, 2017    (CN) .......................... 2017 1 0298560

(51) Int. Cl.
*G09G 5/391*    (2006.01)
*G06T 7/11*    (2017.01)
(Continued)

(52) U.S. Cl.
CPC ............. *G09G 5/391* (2013.01); *G06F 3/013* (2013.01); *G06F 3/1454* (2013.01);
(Continued)

(58) Field of Classification Search
CPC ....... G06T 7/11; G06T 3/0012; G06F 3/1454; G06F 3/013; G09G 2340/0407; G09G 5/391
See application file for complete search history.

(56) References Cited

U.S. PATENT DOCUMENTS 8,363,953 B2    9/2013    Kameyama
8,532,394 B2    9/2013    Kameyama
(Continued)

FOREIGN PATENT DOCUMENTS

CN    102098500 A    6/2011
CN    102325257 A    1/2012
(Continued)

OTHER PUBLICATIONS

International Search Report and Written Opinion issued in PCT/CN2018/082443, dated Jun. 27, 2018; ISA/CN, with English translation thereof.

*Primary Examiner* — Casey L Kretzer
(74) *Attorney, Agent, or Firm* — Harness, Dickey & Pierce, P.L.C.

(57) ABSTRACT

Disclosed are a method and device for transmitting image data, a storage medium, and a processor. The method comprises: segmenting a target image into multiple regional images having different resolutions, wherein the target image comprises a first regional image and a second regional image, the first regional image is an image in a region on which a gaze point falls, and the second regional image is a regional image other than the first regional image in the target image; and transmitting header information of the
(Continued)

multiple regional images and pixel values of respective pixels in the respective regional images. The present invention solves a technical problem in which since image data in multiple formats are transmitted in practice and each image data transmitting apparatus can only transmit image data in a certain format, such format limitation results in poor compatibility between image data transmitting apparatuses.

10 Claims, 3 Drawing Sheets

(51) Int. Cl.
    *G06F 3/14*     (2006.01)
    *G06T 3/00*     (2006.01)
    *G06F 3/01*     (2006.01)

(52) U.S. Cl.
    CPC .............. *G06T 3/0012* (2013.01); *G06T 7/11* (2017.01); *G09G 2340/0407* (2013.01)

(56) References Cited

U.S. PATENT DOCUMENTS

| | | | |
|---|---|---|---|
| 2003/0198393 A1* | 10/2003 | Berstis | G06T 3/0012 382/239 |
| 2003/0202581 A1 | 10/2003 | Kodama | |
| 2010/0119157 A1 | 5/2010 | Kameyama | |
| 2012/0236937 A1 | 9/2012 | Kameyama | |
| 2017/0236466 A1* | 8/2017 | Spitzer | G09G 3/3275 345/560 |
| 2018/0136720 A1* | 5/2018 | Spitzer | G09G 5/391 |
| 2019/0318708 A1* | 10/2019 | Tall | G06T 9/00 |

FOREIGN PATENT DOCUMENTS

| | | |
|---|---|---|
| CN | 103391442 A | 11/2013 |
| CN | 105635624 A | 6/2016 |
| CN | 107168668 A | 9/2017 |

* cited by examiner

DIVIDING IMAGE DATA INTO REGIONAL IMAGES OF DIFFERENT RESOLUTIONS BASED ON A GAZE POINT AND TRANSMITTING THE DIVIDED IMAGE DATA

CROSS REFERENCE TO RELATED APPLICATION

The present application is the U.S. national phase of International Application No. PCT/CN2018/082443, filed on Apr. 10, 2018, which claims priority to Chinese Patent Application No. 201710298560.3, titled "METHOD AND DEVICE FOR TRANSMITTING IMAGE DATA, STORAGE MEDIUM, AND PROCESSOR", filed on Apr. 28, 2017 with the State Intellectual Property Office of the People's Republic of China, which are both incorporated herein by reference in their entirety.

FIELD

The present disclosure relates to the field of data transmission, and particularly, to a method and an apparatus for transmitting image data, a storage medium and a processor.

BACKGROUND

Currently, in the conventional process of transmitting images to a display device by a computer, the format of the transmitted image data is not fixed, and the formats of the image data transmitted by different computers to different display devices are different. For example, the format of the transmitted image by computer A to display device A is A; the format of the transmitted image by computer B to display device B is B, where computer A can transmit image data in format A, and display device B can receive image data in format B. Therefore, computer A and display device B cannot transmit image data to each other due to the limitation of the format of the image data, resulting in poor compatibility between the image data transmission devices.

The transmission involves image data in multiple formats, and both transmission sides of image data can only transmit image data in a specific format, such that both transmission sides of the image data are confined by the format of the image data, resulting in poor compatibility between image data transmission devices. No effective solution has been proposed yet.

SUMMARY

A method and an apparatus for transmitting image data, a storage medium and a processor are provided in embodiments of the present disclosure, to at least solve the technical problem of poor compatibility between image data transmission devices caused by format limitation on each image data transmission device in the case that image data in multiple formats are transmitted in practice and each image data transmission device can only transmit image data in a certain format.

In one aspect of the embodiments in the present disclosure, there is provided a method for transmitting image data, including: dividing a target image into multiple regional images having different resolutions, where the target image includes a first regional image and a second regional image, the first regional image is an image of a region where a gaze point is located, and the second regional image is a regional image other than the first regional image in the target image; and transmitting head information of the multiple regional images and a pixel value of each pixel in each regional image.

Optionally, the dividing a target image into multiple regional images having different resolutions includes: dividing the target image into multiple regions, to obtain the multiple regional images; and assigning a resolution for each of the multiple regional images, where the resolution of each regional image is different.

Optionally, the assigning a resolution for each of the multiple regional images includes: assigning a first resolution to the first regional image, where the first resolution is an original resolution of the target image; and assigning a second resolution to the second regional image, where the second resolution is lower than the original resolution of the target image.

Optionally, the head information includes a first type of head information, where the first type of head information includes a location of the gaze point; and the transmitting head information of the multiple regional images and a pixel value of each pixel in each regional image includes: transmitting the first type of head information; and transmitting the pixel value of each pixel in each regional image one by one.

Optionally, the head information includes a second type of head information, where the second type of head information is in one-to-one correspondence with each regional image; and the transmitting head information of the multiple regional images and a pixel value of each pixel in each regional image includes: transmitting the second type of head information and the pixel value of each pixel of each regional image one by one.

Optionally, the second type of head information is determined by the following steps: determining a shape, a size, and a resolution of each regional image; determining a location of an anchor point of each regional image; and determining the second type of head information of each regional image based on the shape, the size, the resolution and the location of the anchor point of each regional image.

Optionally, the determining a location of an anchor point of each regional image includes at least one of the following: determining, in the case that the regional image is a rectangle or a rectangular ring, the location of the anchor point as including at least one of the following: a location of a left top corner of the rectangle or the rectangular ring, a location of a right top corner of the rectangle or the rectangular ring, a location of a left bottom corner of the rectangle or the rectangular ring, and a location of a right bottom corner of the rectangle or the rectangular ring, and a location of the center point of the rectangle or the rectangular ring; and determining, in the case that the regional image is a circle or a ring, the location of the anchor point to be a location of the center point of the circle or the ring.

Optionally, the transmitting head information of the multiple regional images and a pixel value of each pixel in each regional image includes at least one of the following: transmitting each regional image one by one in descending order of resolution; transmitting each regional image one by one in ascending order of resolution; and transmitting each regional image one by one in a random order.

According to another embodiment of the present disclosure there is also provided a storage medium including a program stored thereon, where when the program is being run, the method according to any of the above is performed.

According to yet another embodiment of the present disclosure, there is also provided a processor, the processor being configured to run a program, where when running the program, the processor is configured to perform the method according to any of the above.

In the embodiments of the present disclosure, the target image is divided into multiple regional images having different resolutions. The first regional image is an image of a region where a gaze point is located, and the second regional image is a regional image other than the first regional image in the target image. Each regional image is transmitted one by one in a fixed format of image data including head information of each regional image and a pixel value of each pixel in each regional image, so that in the image transmission process, the image is transmitted in the form of image data in the fixed format, which can facilitate the matching of the image data between the transmitting side and the receiving side and further solve the technical problem that poor compatibility between image data transmission devices is caused by format limitation on each image data transmission device in the case that image data in multiple formats are transmitted in practice and each image data transmission device can only transmit image data in a certain format.

BRIEF DESCRIPTION OF THE DRAWINGS

Drawings described herein are intended to provide a further understanding of the present disclosure, and constitute a part of the present disclosure. The exemplary embodiments of the present disclosure and descriptions thereof are meant to making clear rather than limiting the present disclosure. In the drawings.

DETAILED DESCRIPTION

In order for those skilled in the art to better understand the solution in the present disclosure, the technical solutions in the embodiments of the present disclosure are clearly and completely described in the following with reference to the accompanying drawings in the embodiments of the present disclosure. Apparently, the embodiments described simply are only some rather than all embodiments of the present disclosure. Any other embodiments obtained by those skilled in the art based on the embodiments of the present disclosure without any creative efforts shall fall within the scope of the present disclosure.

It should be noted that the terms "first", "second" and the like in the specification and claims of the present disclosure and the above drawings are used to distinguish similar objects, and are not necessarily used to describe a specific order or priority order. It is to be understood that the data so used may be interchanged where appropriate, so that the embodiments of the present disclosure described herein can be implemented in a sequence other than those illustrated or described herein. In addition, the terms "comprise" and "have" and any other variants are intended to cover a non-exclusive inclusion, for example, a process, method, system, product, or device that comprises a series of steps or units is not necessarily limited to those steps or units clearly listed, but may include other steps or units not explicitly listed or inherent to such process, method, product or device.

According to an embodiment of the present disclosure, there is provided a method for transmitting image data, and it is noted that the steps illustrated in the flowchart of the accompanying drawings may be performed by a computer system with a set of computer executable instructions. Also, although logical sequences are shown in the flowcharts, in some cases the steps shown or described may be performed in a different order than the ones described herein.

Figure 1:
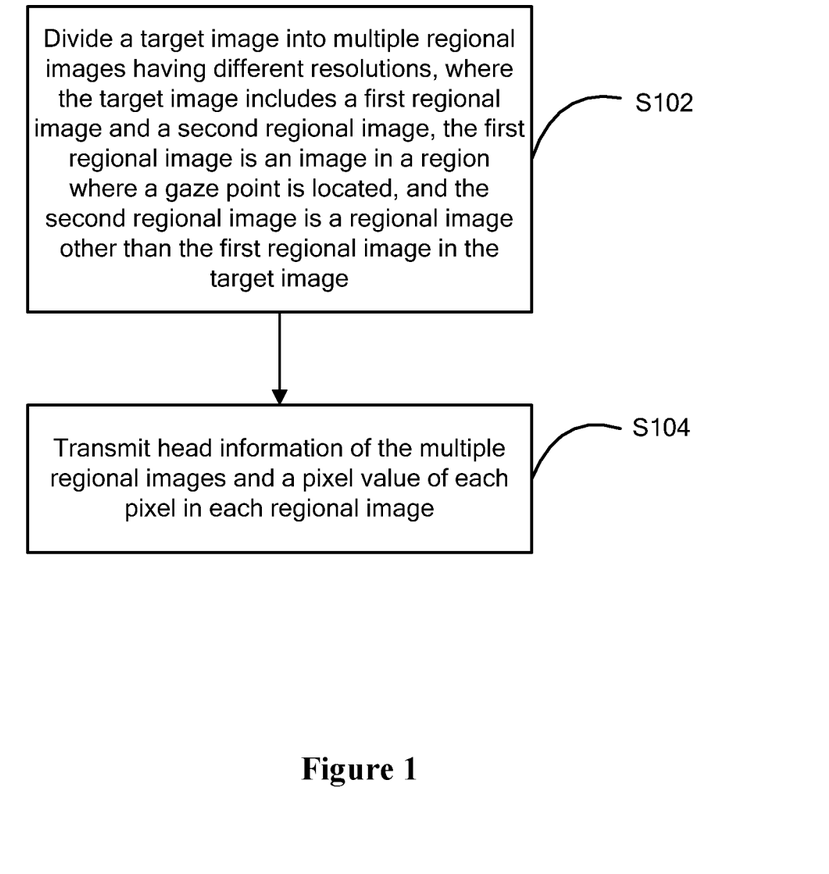
FIG. 1 is a flowchart of a method for transmitting image data according to an embodiment of the present disclosure.

FIG. 1 is a flowchart of a method for transmitting image data according to an embodiment of the present disclosure, and as shown in FIG. 1, the method includes the following steps S102 and S104.

At step S102, a target image is divided into multiple regional images having different resolutions, where the target image includes a first regional image and a second regional image, the first regional image is an image of a region where a gaze point is located, and the second regional image is a regional image other than the first regional image in the target image.

At step S104, head information of the multiple regional images and a pixel value of each pixel in each regional image are transmitted.

Through the above steps, the target image is divided into multiple regional images having different resolutions. The first regional image is an image of a region where a gaze point is located, and the second regional image is a regional image other than the first regional image in the target image. Each regional image is transmitted one by one in a fixed format of image data including head information of each regional image and a pixel value of each pixel in each regional image, so that in the image transmission process, the image is transmitted by image data in the fixed format, which can facilitate the matching of the image data between the transmitting side and the receiving side and further solve the technical problem that poor compatibility between image data transmission devices is caused by format limitation on each image data transmission device in the case that image data in multiple formats are transmitted in practice and each image data transmission device can only transmit image data in a certain format.

At step S102, the target image may be divided into multiple regions based on the gaze point, where the region where the gaze point is located in the target image is the first regional image, and the region not including the gaze point in the target image is the second regional image, so that different resolutions can be assigned to images of different regions according to the user's visual habits and actual needs.

It should be noted that the gaze point may be a point of interest of the user. When the user views the target image, the user's eyes first pay attention to a point in the target image, and then view the target image with the point as the focus. Therefore, the focus of the user's attention to the image is the gaze point.

Optionally, the image may be divided into multiple regions based on the gaze point, and the shape of each regional image may include, but is not limited to, a circle, a rectangle, or an ellipse.

Optionally, the first regional image may be a key region showed in the target image, and the second regional image may be a background region of the target image.

Optionally, the gaze point may be in the middle of the first regional image.

Optionally, the second regional image may surround the first regional image.

Optionally, the target image may include multiple second regional images.

Optionally, the multiple second regional images each may sequentially surround a previous regional image. For example, in the case where the target image is divided into multiple circular regional images or ring regional images, the target image is divided into a circular regional image including the gaze point and multiple regional images of concentric ring shapes surrounding the circular regional image, with the gaze point as the center of the circle. The circular regional image where the gaze point is located is the first regional image, and the multiple rings outside the circular region are the second regional image. The regional image of the first ring surrounds the first regional image; the regional image of the second ring surrounds the regional image of the first ring; the regional image of the third ring surrounds the regional image of the second ring, and so on, to obtain multiple ring-shaped second regional images. It should be noted that, in the case where the target image is a rectangle, the shape of the outermost second regional image may be an annulus having an outer edge being a rectangular frame of the target image and a circular inner edge.

In an optional embodiment, the target image is divided into three regional images, namely, a regional image A, a regional image B, and a regional image C. The regional image A is the first regional image, and the regional image B and the regional image C are the second regional images. The regional image A is a circle with the gaze point as the center in the target image; the regional image B is a ring which is centered at the gaze point in the target image and takes the regional image A as its inner circle; and the regional image C is the rest of the target image other than the regional image A and the regional image B.

Optionally, the target image may be divided into multiple concentric circles. For example, in the case where the target image is divided into multiple circles, the image is divided into multiple concentric circles with the gaze point as the center.

In an optional embodiment, the target image is divided into three regional images, namely, a regional image A, a regional image B, and a regional image C. The regional image A is the first regional image, and the regional image B and the regional image C are the second regional images. The regional image A is a circle centered at the gaze point in the target image; the regional image B is a circle with the gaze point as the center and having a radius larger than that of the regional image A in the target image, and the regional image C has a same size and a same shape as the target image.

It should be noted that, in the process of transmitting multiple regional images, overlapped portions of the multiple regional images are transmitted only once.

In an optional embodiment, the regional image A is a circle centered at the gaze point in the target image; the regional image B is a circle centered at the gaze point and having a radius greater than that of the regional image A, and the regional image C has a same size and a same shape as the target image. In the image transmission process, the regional image A, the rest of the regional image B other than the regional image A, and the rest of the regional image C other than the regional image B are transmitted.

At step S104, the head information may be determined based on the multiple regional images as divided, and is used for indicating outlines and locations of the multiple regional images. The pixel value of each pixel in each regional image may be a pixel value of each pixel in an outline region determined by corresponding head information.

Optionally, a display screen may determine, according to the head information, corresponding regions of the multiple regional images on the display screen.

Optionally, the number of pixels in each regional image may be determined according to the resolution of each regional image.

Optionally, the pixel value of each pixel in each regional image may be transmitted in an order of raster scanning.

In an optional embodiment, dividing the target image into multiple regional images having different resolutions includes: dividing the target image into multiple regions to obtain multiple regional images; and assigning a resolution to each of the multiple regional images, where the resolution of each regional image is different.

In the above embodiment of the present disclosure, the target image is divided into multiple regions to obtain multiple regional images, a corresponding resolution is assigned to each regional image, and a corresponding region image is rendered according to the assigned resolution, to obtain multiple regional images with different resolutions. In this way, the target image can be divided into multiple regional images with different resolutions. Therefore, compared to transmitting the target image directly with the original resolution of the target image, the data amount of the target image after assigning different resolutions to multiple regions is lower than the data amount of the target image in the original resolution, facilitating the application of the target image.

It should be noted that the target image may be an image to be transmitted, and the target image is divided into multiple regions, wherein the image represented by each region in the target image is the regional image.

Optionally, the target image may be divided into multiple target images of a predetermined shape.

In an optional embodiment, in the case where the predetermined shape is a circle, multiple concentric circles may be drawn on the target image, and the target image is divided into a circle in the middle and multiple surrounding rings.

In an optional embodiment, in a case where the predetermined shape is a rectangle, multiple rectangles may be drawn on the target image, and the target image is divided into a rectangle in the middle and multiple surrounding rectangular rings.

It should be noted that an image includes multiple uniformly distributed pixels, each pixel presents a different color, and multiple pixels with different colors together constitute an image. Resolution is a reference quantity used to represent the definition of an image. The resolution may be expressed by the number of pixels. For example, a resolution of 160×128 means that the horizontal direction contains 160 pixels and the vertical direction contains 128 pixels. Thus, the resolution of the image can be changed by changing the number of pixels within the image. Therefore, the higher the resolution of the image is, the greater the number of pixels within the image is. The definition of each regional image is changed by assigning a different resolution to each corresponding regional image.

It should be noted that the more pixels the image has, the larger the data amount of the image is, where the data amount may be the data size. For example, if the size of the image A is 5 MB, the amount of data of the image A will be 5 megabytes.

Optionally, a resolution is assigned to each of the multiple regional images, where the resolution may be assigned to each regional image by rendering.

In an optional embodiment, assigning a resolution to each of the multiple regional images includes: assigning a first resolution to the first regional image, where the first resolution is an original resolution of the target image; and assigning a second resolution to the second regional image, where the second resolution is lower than the original resolution of the target image.

In the above embodiment of the present disclosure, the original resolution of the target image is assigned as the first resolution of the first regional image, and a resolution lower than the original resolution of the target image is assigned as the resolution of the second regional image, so that the definition of the first regional image on which the user focuses can be guaranteed, and the definition of the background region is decreased, thereby reducing the data amount of the target image and facilitating image transmission while ensuring the user's viewing experience.

It should be noted that in the process of viewing any image (an image without assigning different resolution to different regions), the user mainly pays attention to the content around the point of interest, and views the content in background with residual vision, that is, in the process of viewing an image by a user, a region closer to the point of interest is clearer to the user, and a region farther from the point of interest is obscurer to the user. Therefore, by using this rule, in the above embodiment, a higher resolution is assigned to the first regional image, and a lower resolution is assigned to the second regional image. The data amount of the target image can be reduced by reducing the resolution of the second regional image without affecting the user experience of the user when viewing the target image, which facilitates image transmission.

Optionally, in the case where there are multiple second regional images, a lower resolution is assigned to a regional image farther from the point of interest, and a higher resolution is assigned to a regional image closer to the point of interest.

In an optional embodiment, in the target image, the first regional image is a circle centered at the point of interest, and the second regional image is multiple rings centered at the point of interest and surrounding the first regional image. The resolution assigned to the first regional image is the original resolution of the target image, the resolution assigned to the second regional image is lower than the original resolution of the target image, and the greater the distance between a ring and the point of interest is, the lower a resolution assigned thereto is.

Optionally, in the case that the target image includes multiple second regional images, resolutions assigned to the multiple regional images may decrease exponentially in an ascending order of the distances between the multiple regional images and the gaze point. For example, for two adjacent regional images, the resolution of the regional image farther from the gaze point is 1/N of that of the regional image closer to the gaze point.

In an optional embodiment, the original resolution of the target image is a, and the target image includes multiple second regions, where in an ascending order of distances to the gaze point, the multiple second regions are sequentially a regional image A, the regional image B. If the decrease exponent of resolution is 50%, the resolution assigned to the first regional image is a, the resolution assigned to the regional image A is 50% a and the resolution assigned to the regional image B is 50%*50% a=25% a.

In an optional embodiment, assigning the second resolution to the second regional image includes: converting the resolution of the second regional image to the second resolution lower than the original resolution by performing N-fold subsampling on the second regional image.

In the above embodiment of the present disclosure, subsampling is performed on the second regional image, and the resolution of the second regional image is reduced to the second resolution, so that the resolution of the second regional image can be reduced without changing the original display content of the second regional image.

It should be noted that subsampling (subsampled) is to lower the resolution of an image and reduce the size of the image, so that the image can be displayed on a display device having a resolution lower than the resolution of the image.

Optionally, in performing subsampling on the second regional image, multiple pixel points in the second regional image may be intermittently sampled by a low pass filter to obtain a second regional image having the second resolution.

In an optional embodiment, N-fold subsampling is performed on an image having an original size of P*Q, to obtain an image having a resolution of (P/N)*(Q/N).

It should be noted that N should be a common divisor of P and Q. If the original image is a rectangular image, the image within an N*N window in the original image is turned into a pixel, and the value of this pixel is an average of all the pixel values in the window.

In an optional embodiment, transmitting image data of each of the multiple regional images one by one includes: determining head information of each regional image and a pixel value of each pixel in each regional image; and transmitting the head information of each regional image and the pixel value of each pixel of each regional image.

In the above embodiment of the present disclosure, the head information of each pixel and the pixel value of each pixel in each regional image is first determined, and image data including head information of each regional image and the pixel value of each pixel in each regional image is transmitted in the transmission process, which can facilitate the recipient to restore each regional image based on the transmitted image data.

In an optional embodiment, the head information includes a first type of head information, where the first type of head information includes a location of the gaze point, and transmitting head information of the multiple regional images and a pixel value of each pixel in each regional image includes transmitting the first type of head information and transmitting a pixel value of each pixel of each regional image one by one.

In the above embodiment of the present disclosure, in the process of transmitting the multiple regional images, the first type of head information determined based on the location of the gaze point of the multiple regional images divided in the target image, and a pixel value of each pixel in each regional image may be transmitted, thereby completing the image transmission.

It should be noted that the process of transmitting the multiple regional images involves the transmitting side of the image data and the receiving side of the image data. The transmission side of the image data divides the target image into the first regional image including the gaze point and the second regional image based on the gaze point information in advance, and then the multiple divided regional images are transmitted. In the receiving side of the image data, a manner of dividing the target image into multiple regional images is stored in advance, and the receiving side of image data only needs to get the location of the gaze point of the multiple regional images divided in the target image, to restore information such as a shape, a location, a size, a resolution, and the like of each regional image, thereby determining the head information corresponding to each regional image.

In the above embodiment of the present disclosure, the location of the gaze point is transmitted, and head information corresponding to each regional image is determined by the receiving side based on the division manner of the multiple regional images, thereby reducing the data amount of image data to be transmitted required during the image transmission and improving data transmission efficiency.

Optionally, in the process of transmitting the multiple regional images, location information of the anchor point of each regional image may also be transmitted, and a pixel value of each pixel of each regional image is transmitted one by one.

It should be noted that the anchor point is a point for determining the location of each regional image.

In an optional embodiment, the multiple regional images include a regional image A and a regional image B. The regional image A includes an anchor point A, and the regional image B includes an anchor point B. In the process of transmitting image data, the transmitting side of the image data transmits the location of the anchor point A of the regional image A, the location of the anchor point B of the regional image B, and a pixel value of each pixel of the regional image A and the regional image B. The receiving side of the image data may restore the regional image A and the regional image B based on the location of the anchor point A and the location of the anchor point B, thereby determining the head information of the regional image A and the head information of the regional image B, so that the receiving side of the image data can obtain the head information and the pixel value of each pixel of the regional image A, along with the head information and the pixel value of each pixel of the regional image B.

In an optional embodiment, the head information includes a second type of head information, where the second type of head information is in one-to-one correspondence with each regional image, and transmitting the head information of the multiple regional images and the pixel value of each pixel in each regional image includes transmitting the second type of head information and a pixel value of each pixel of each regional image one by one.

In the above embodiment of the present disclosure, the second type of head information of each of the multiple regional images and the pixel value of each pixel are transmitted one by one, thereby completing image transmission.

In an optional embodiment, the multiple regional images include a regional image A and a regional image B. In the image data transmission process, the second type of head information corresponding to the regional image A and the pixel value of each pixel thereof are transmitted, and then the second type of head information corresponding to the regional image B and the pixel value of each pixel thereof are transmitted.

In an optional embodiment, the second type of head information may be determined by the following steps: determining a shape, a size, and a resolution of each regional image; determining a location of the anchor point of each regional image; and determining the second type of head information of each regional image based on the shape, the size, the resolution, and the location of the anchor point of each regional image.

In the above embodiment of the present disclosure, by determining the shape, the size and the resolution of each regional image, and the location of the anchor point of each regional image, and determining the second type of head information of each regional image based on the shape, the size, the resolution, and the location of the anchor point of each regional image, the outline and the location of each regional image in the target image can be accurately determined to ensure the accuracy of transmitting an image.

Optionally, each regional image may include multiple anchor points.

In an optional embodiment, determining the location of the anchor point of each regional image includes at least one of the following: determining, in the case that the regional image is a rectangle or a rectangular ring, the location of the anchor point as including at least one of the following: a location of a left top corner of the rectangle or the rectangular ring, a location of a right top corner of the rectangle or the rectangular ring, a location of a left bottom corner of the rectangle or the rectangular ring, a location of a right bottom corner of the rectangle or the rectangular ring, and a location of the center point of the rectangle or the rectangular ring; and determining, in the case that the regional image is a circle or a ring, the location of the anchor point to be a location of the center point of the circle or the ring.

With the above embodiments of the present disclosure, different anchor points can be flexibly selected in the case where the regional images are in different shapes, so that the selected anchor points can be applied to the regional images in various shapes.

In an optional embodiment, the transmitting head information of the multiple regional images and a pixel value of each pixel in each regional image includes at least one of the following: transmitting each regional image one by one in descending order of resolution; transmitting each regional image one by one in ascending order of resolution; and transmitting each regional image one by one in a random order.

With the above embodiment of the present disclosure, multiple regional images having different resolutions are separately transmitted, where a regional image is transmitted after a preceding regional image has been transmitted, thereby separately transmitting each regional image, and ensuring accuracy of transmitting each regional image.

A method for labeling bitstreams of a layered image is further provided according to a preferred embodiment of the present disclosure.

The image transmission method and the image display method of the present disclosure can be applied between a VR device and a computer.

In the process of transmitting an image between a VR device and a computer, transmitting an image with a full resolution will increase the demand of data transmission. In practical application, an image displayed by the VR device is generally a rendered image.

Optionally, the image displayed by the VR device may be an image which has been rendered with the gaze point, where a region around the gaze point in the image is an image with the same resolution as the original image and images displayed in other regions have resolutions lower than that of the original image. That is to say, in the display regions of the entire screen, different regional images have different resolutions, so it is not necessary to transmit the image in the full resolution during the practical transmission.

The above embodiments of the present disclosure can be applied to a VR system, particularly to a wireless VR system, which includes an eye control circuitry, a computing circuitry/image transmitter (PC or mobile phone), and a display unit/image receiver.

Optionally, the eye control circuitry may be configured to determine a gaze point of a user.

The flow of transmitting a layered image according to the present disclosure includes:

1. obtaining a gaze point of a user;
2. determining a manner of region division based on the gaze point;
3. obtaining different regional images by using the gaze point rendering technique, where a rendering resolution of each regional image is different;
4. transmitting the different regional images one by one by the rendering resolution of each regional image, until all regional images are transmitted;
5. determining a correspondence relationship between each pixel in each regional image and a screen pixel after a display device obtains each regional image; and
6. displaying all pixels of all regional images on the screen.

Optionally, in determining the correspondence relationship between each pixel in each regional image and the screen pixel, for regional images having rendering resolutions lower than a screen resolution, full resolutions of the regional images are obtained by using an interpolation method, such that each pixel in each regional image has a one-to-one correspondence with the screen pixel.

Optionally, determining a manner of region division based on the gaze point includes: specifying, based on a location of the gaze point, a shape and a size of a key region, and a shape and a size of a background region.

Optionally, n-fold subsampling may be performed on the background region without subsampling the key region, and locations and sizes of the background region, the key region and each region are transmitted to a decoding terminal.

Optionally, the key region may as well be layered, and m-fold subsampling may be performed on a background in the key region.

Figure 2:
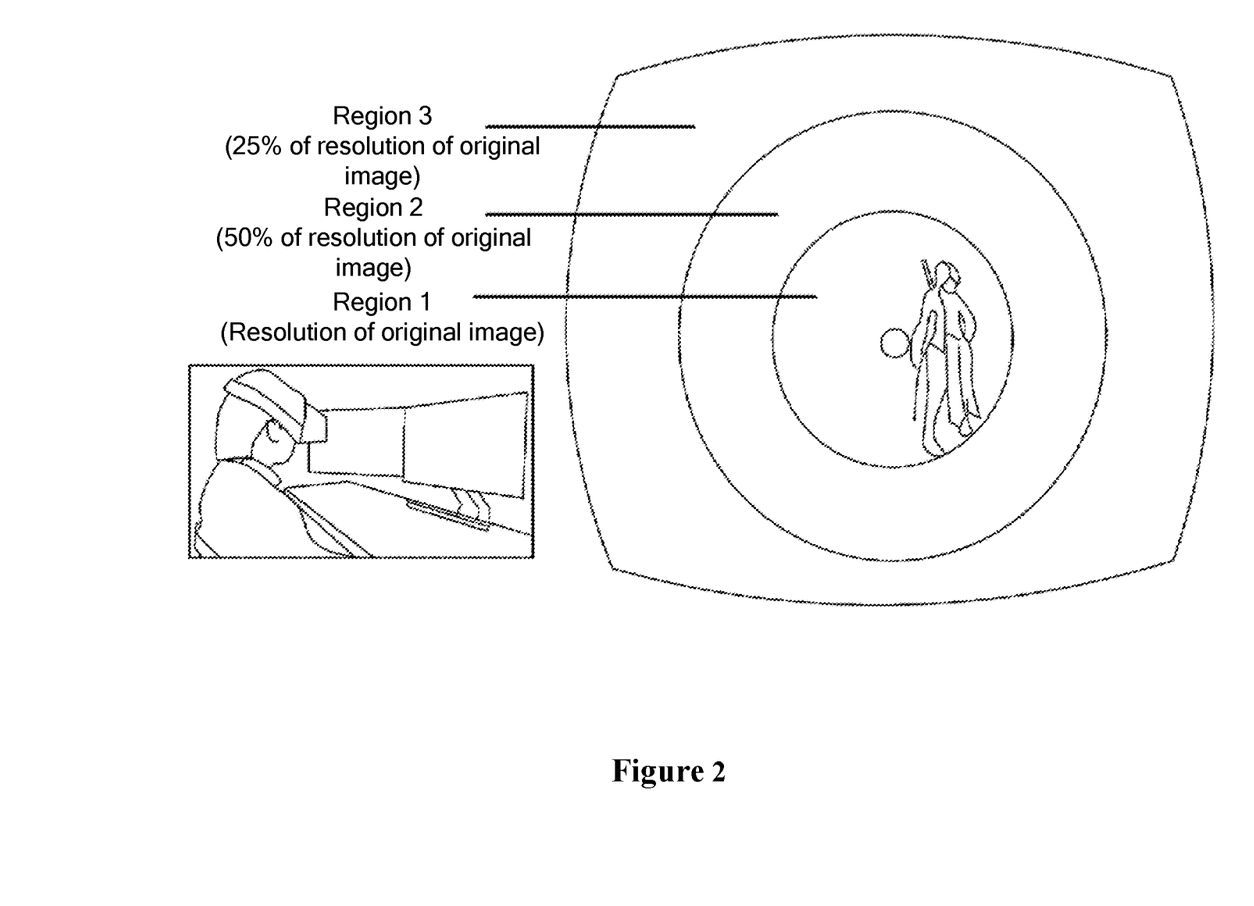
FIG. 2 is a schematic diagram of an optional region division of an image according to an embodiment of the present disclosure.

FIG. 2 is a schematic diagram of an optional region division of an image according to an embodiment of the present disclosure. As shown in FIG. 2, based on the location of the gaze point, the key region is specified to be a circle (region 1), the background region is a region other than the key region in the image, where the background region includes a ring region (region 2) and a region (region 3) other than the key region and the ring region in the image. The key region has the resolution of the original image, the resolution of the ring region in the background region is half of the resolution of the original image, and the resolution of the region other than the focus region and the ring region in the background region is 25% of the resolution of the original image.

In the region division image transmission process according to the above embodiment of the present disclosure, a bitstream structure for transmitting each regional image is as follows:

at initial, transmitting the number K of regional images, the shape of each regional image, and the size of each regional image.

In the process of transmitting each image frame, the format of the transmitted bitstream is as follows:

the location (X, Y) of the first regional image, image data of the first regional image (the pixel value of the first pixel, the pixel value of the second pixel . . . arranged in an order of raster scanning), the location of the second regional image, image data of the second regional image, . . . , the location of the $K^{th}$ regional image, image data of the $K^{th}$ regional image.

Optionally, in the image transmission process, the key regional image (a regional image with a high resolution) is transmitted first, and the background region (a regional image with a low resolution) is transmitted afterwards.

Optionally, the first transmitted regional image is the first regional image, and the last transmitted regional image is the $K^{th}$ regional image.

Optionally, location coordinate information of each regional image, that is, the location (X, Y) of each regional image, may be the coordinates of the center of the regional image, or coordinates of a left top corner of the regional image.

Optionally, each frame of transmitted image data includes pixel data of coordinates included in the regional image and excluded in a preceding regional image.

Optionally, in the process of transmitting an image, each pixel in the image may be sequentially transmitted in an order of raster scanning.

To achieve the above objective, in another aspect of present disclosure, a storage medium is further provided according to an embodiment of the present disclosure, which includes a program stored thereon. When the program is being run, the method for transmitting image data described above is performed by a device which includes the storage medium.

To achieve the above objective, in another aspect of the present disclosure, a processor is further provided according to an embodiment of the present, which is configured to run a program. When running the program, the processor is configured to perform the method for transmitting image data described above.

An apparatus for transmitting image data is further provided according to an embodiment of the present disclosure. It is to be noted that the apparatus for transmitting image data may be configured to perform the method for transmitting image data according to the embodiment of the present disclosure. The method for transmitting image data according to the embodiment of the present disclosure can be performed by the apparatus for transmitting image data.

Figure 3:
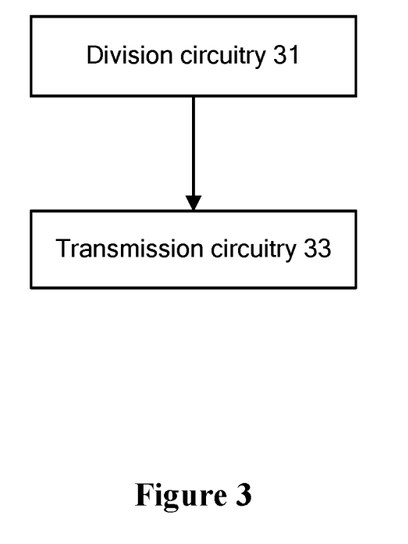
FIG. 3 is a schematic diagram of an apparatus for transmitting image data according to an embodiment of the present disclosure.

FIG. 3 is a schematic diagram of the apparatus for transmitting image data according to an embodiment of the present disclosure. As shown in FIG. 3, the apparatus may include: a division circuitry 31, configured to divide a target image into multiple regional images having different resolutions, where the target image includes a first regional image and a second regional image, the first regional image is an image of a region where a gaze point is located, and the second regional image is a regional image other than the first regional image in the target image; and a transmission circuitry 33, configured to transmit head information of the multiple regional images and a pixel value of each pixel in each regional image.

It should be noted that the division circuitry 31 in this embodiment may be configured to perform the step S102 in the embodiment of the present disclosure, and the transmission circuitry 33 in this embodiment may be configured to perform the step S104 in the embodiment of the present disclosure. The above modules are the same as the corresponding steps with respect to the examples achieved and the application scenarios, but are not limited to the above-described embodiments.

In the above embodiment of the present disclosure, the target image is divided into multiple regional images having different resolutions. The first regional image is an image of a region where a gaze point is located, and the second regional image is a regional image other than the first regional image in the target image. Each regional image is transmitted one by one in a fixed format of image data including head information and a pixel value of each pixel in each regional image, so that in the image transmission process, the image is transmitted in the form of image data in the fixed format, which can facilitate the matching of the image data between the transmitting side and the receiving side, and further solve the technical problem that poor compatibility between image data transmission devices is caused by format limitation on each image data transmission device in the case that image data in multiple formats are transmitted in practice and each image data transmission device can only transmit image data in a certain format.

In an optional embodiment, the division circuitry may include: a division module configured to divide the target image into multiple regions to obtain multiple regional images; and an assignment module configured to assign a resolution to each of the multiple regional images, where each regional image has a different resolution.

In an optional embodiment, the assignment module may include: a first assignment submodule configured to assign a first resolution to the first regional image, where the first resolution is an original resolution of the target image; and a second assignment submodule configured to assign a second resolution to the second regional image, where the second resolution is lower than the original resolution of the target image.

In an optional embodiment, the second assignment submodule may include: a subsampling module configured to convert the resolution of the second regional image to the second resolution lower than the original resolution by subsampling the second regional image.

In an optional embodiment, the head information includes a first type of head information, where the first type of head information includes a location of the gaze point, and the transmission circuitry may include: a first transmission module configured to transmit the first type of head information; and a second transmission module configured to transmit a pixel value of each pixel in each regional image one by one.

In an optional embodiment, the head information includes a second type of head information, where the second type of head information is in one-to-one correspondence with each regional image; and the transmission circuitry may include: a third transmission module, configured to transmit the second type of head information and the pixel value of each pixel of each regional image one by one.

In an optional embodiment, the second type of head information is determined by the following modules: a first determination module configured to determine a shape, a size and a resolution of each regional image; a second determination module configured to determine the location of an anchor point of each regional image; a third determination module configured to determine the second type of head information of each regional image based on the shape, the size, the resolution, and the location of the anchor point of each regional image.

In an optional embodiment, the second determination module may include at least one of the following: a rectangle determination module, configured to, in the case that the regional image is a rectangle or a rectangular ring, determine the location of the anchor point as including at least one of the following: a location of a left top corner of the rectangle or the rectangular ring, a location of a right top corner of the rectangle or the rectangular ring, a location of a left bottom corner of the rectangle or the rectangular ring, a location of a right bottom corner of the rectangle or the rectangular ring, a location of the center point of the rectangle or the rectangle ring; and a circle determination module configured to, in the case that the regional image is a circle or a ring, determine the location of the anchor point to be a location of the center point of the circle or the ring.

In an optional embodiment, the transmission circuitry includes at least one of the following: a fourth transmission module configured to transmit each regional image one by one in descending order of resolution; a fifth transmission module configured to transmit each regional image one by one in ascending order of resolution; a the sixth transmission module configured to transmit each regional image one by one in a random order.

The foregoing serial numbers of the embodiments of the present disclosure are merely for purpose of description, and do not represent an order of merits of the embodiments.

In the above-mentioned embodiments of the present disclosure, the descriptions of the various embodiments are differently emphasized, and the parts that are not detailed in a certain embodiment can be referred to the related descriptions of other embodiments.

In the embodiments according to the present disclosure, it should be understood that the disclosed technical content may be implemented in other manners. The apparatus embodiment described above is only exemplary. For example, the division of the unit may be a logical function division. In practical implementation, there may be another division manner, for example, multiple units or components may be combined or integrated into another system, or some features can be ignored or not executed. In addition, the mutual coupling or direct coupling or communication connection shown or discussed may be an indirect coupling or communication connection through some interfaces, units or modules, which may be electrical or otherwise.

The units described as separate components may or may not be physically separated, and the components displayed as units may or may not be physical units, that is, they may be located in one place, or may be distributed to multiple units. Some or all of the units may be selected according to practical needs to achieve the purpose of the solution of the embodiment.

In addition, functional units in each embodiment of the present disclosure may be integrated into one processing unit, or may exist physically separately, or two or more units may be integrated into one unit. The above integrated unit can be implemented in the form of hardware or in the form of a software functional unit.

The integrated unit, if implemented in the form of a software functional unit and sold or used as a standalone product, may be stored in a computer readable storage medium. Based on such understanding, the essence or the part contributing to the prior art of the technical solution of the present disclosure, or all or part of the technical solution, may be embodied in the form of a software product. The soft product of the computer is stored in a storage medium, and includes a number of instructions which enable a computer device (which may be a personal computer, a server or a network device, etc.) to perform all or part of the steps of the methods described in various embodiments of the present disclosure. The foregoing storage medium includes: a U disk, a Read-Only Memory (ROM), a Random Access Memory (RAM), a portable hard disk, a magnetic disk, or an optical disk, and the like.

The above-described are only some preferred embodiments of the present disclosure, and it should be noted that those skilled in the art can make numerous improvements and refinements without departing from the principles of the present disclosure. And these improvements and refinements shall also fall within the scope of protection of the present disclosure.

The invention claimed is:

1. A method for transmitting image data, comprising:
dividing a target image into a plurality of regional images having different resolutions, wherein the target image comprises a first regional image and a second regional image, the first regional image is an image of a region where a gaze point is located, and the second regional image is a regional image other than the first regional image in the target image; and
transmitting head information of the plurality of regional images and transmitting a pixel value of each pixel in each regional image one by one.

2. The method according to claim 1, wherein the dividing a target image into a plurality of regional images having different resolutions comprises:
dividing the target image into a plurality of regions, to obtain the plurality of regional images; and
assigning a resolution for each regional image in the plurality of regional images, wherein the resolution of each regional image is different.

3. The method according to claim 2, wherein the assigning a resolution for each regional image in the plurality of regional images comprises:
assigning a first resolution to the first regional image, wherein the first resolution is an original resolution of the target image; and
assigning a second resolution to the second regional image, wherein the second resolution is lower than the original resolution of the target image.

4. The method according to claim 1, wherein
the head information comprises a first type of head information, wherein the first type of head information comprises a location of the gaze point; and
the transmitting head information of the plurality of regional images comprises:
transmitting the first type of head information.

5. The method according to claim 1, wherein
the head information comprises a second type of head information, wherein the second type of head information is in one-to-one correspondence with each regional image; and
the transmitting head information of the plurality of regional comprises:
transmitting the second type of head information one by one.

6. The method according to claim 5, wherein the second type of head information is determined by the following steps:
determining a shape, a size, and a resolution of each regional image;
determining a location of an anchor point of each regional image; and
determining the second type of head information of each regional image based on the shape, the size, the resolution, and the location of the anchor point of each regional image.

7. The method according to claim 6, wherein the determining a location of an anchor point of each regional image comprises at least one of the following:
determining, in the case that the regional image is a rectangle or a rectangular ring, the location of the anchor point as comprising at least one of the following: a location of a left top corner of the rectangle or the rectangular ring, a location of a right top corner of the rectangle or the rectangular ring, a location of a left bottom corner of the rectangle or the rectangular ring, a location of the right bottom corner of the rectangle or the rectangular ring, and a location of the center point of the rectangle or the rectangular ring; and
determining, in the case that the regional image is a circle or a ring, the location of the anchor point to be a location of the center point of the circle or the ring.

8. The method according to claim 1, wherein the transmitting head information of the plurality of regional images and transmitting a pixel value of each pixel in each regional image one by one comprises at least one of the following:
transmitting each regional image one by one in descending order of resolution;
transmitting each regional image one by one in ascending order of resolution; and
transmitting each regional image one by one in a random order.

9. A non-transitory computer readable storage medium comprising a program stored thereon, wherein when being run, the program enables a device comprising the storage medium to perform the method for transmitting image data according to claim 1.

10. A processor, configured to run a program, wherein when running the program, the processor is configured to perform the method for transmitting image data according to claim 1.

* * * * *